United States Patent [19]

Kitchens et al.

[11] Patent Number: 4,767,564

[45] Date of Patent: Aug. 30, 1988

[54] CHEMICAL COMPOSITION FOR THE DESTRUCTION OF MICROFILM PRODUCTS

[75] Inventors: Judith F. Kitchens, Haymarket; Carl H. Culp, Sr., Vienna, both of Va.; Anthony T. Shemonski, Columbia, Md.

[73] Assignee: The United States of America as represented by the Secretary of the Air Force, Washington, D.C.

[21] Appl. No.: 116,132

[22] Filed: Feb. 4, 1980

[51] Int. Cl.[4] .................................... C09K 3/00

[52] U.S. Cl. .................... 252/187.26; 106/135; 106/311; 252/104; 252/170; 252/DIG. 8

[58] Field of Search .............. 252/187 H, 104, 187.26, 252/170, DIG. 8; 106/135; 109/29

[56] References Cited

U.S. PATENT DOCUMENTS

| | | | |
|---|---|---|---|
| 2,143,629 | 1/1939 | Nadeau et al. | 252/104 X |
| 2,461,476 | 2/1949 | Kaszuba | 106/135 |
| 3,033,680 | 5/1962 | Milton et al. | 106/135 |
| 3,688,708 | 9/1972 | Meyerhoefer | 109/29 |
| 3,871,281 | 3/1975 | Leonard et al. | 109/29 |

OTHER PUBLICATIONS

Baker, "An Analysis of Classified Film Destruction Method which Recovers Silver", Afwl Kirtland AFB, New Mexico, AFWL-TR-73-221, Nov. 1973, NTIS No. AO 771810.

Rod, "Reclamation Process for the Recovery of Precious Metals", Army Material Command, Texarkana, Texas, Apr. 1975, NTIS No. ADA009184.

*Primary Examiner*—Herbert B. Guynn

*Attorney, Agent, or Firm*—Donald J. Singer; Jacob N. Erlich; William J. O'Brien

[57] ABSTRACT

A chemical solution for effecting the rapid destruction of microfilm products comprising a mixture of 4-butyrolactone, methyl Cellosolve acetate and aqueous sodium hypochlorite.

2 Claims, No Drawings

CHEMICAL COMPOSITION FOR THE DESTRUCTION OF MICROFILM PRODUCTS

STATEMENT OF GOVERNMENT INTEREST

The invention described herein may be manufactured and used by or for the Government for governmental purposes without the payment of any royalty thereon.

BACKGROUND OF THE INVENTION

This invention relates to the destruction of microform materials, especially those of a confidential or classified nature. More particularly, this invention concerns itself with a chemical mixture or destruction solution for effecting the rapid destruction of microform materials.

The storage, retrieval and distribution of information of a technical nature has become a problem of great importance in light of the many advances made in virtually all areas of science and technology. One system which has found wide acceptance, involves the use of low cost, high quality microforms such as microfilms, microfiche, aperture cards or roll and cartridge film. The use of microforms allows high quality information to be maintained in a minimal amount of space at various locations, thus maximizing the potential use of the information by scientists and technicians. Also, the ready availability of information and its easy retrieval has great military potential, since it materially assists in the mobilization and operation of tactical units. However, military type information is often of a confidential nature. Therefore, a method for the rapid emergency destruction of classified microforms must be provided in order to avoid the possibility of a compromise situation occurring within a hostile environment.

As a consequence, a number of approaches have been suggested for accomplishing the rapid destruction of microforms. The preferred method involves destruction by burning and is referred to as the pyrolytic method. Theoretically, this method should result in the complete destruction of the microform. Unfortunately, pieces of film can sometimes be recovered from the ash. Another method involves mechanical destruction with shredding or pulverizers. This method, however, requires the use of large pieces of equipment that require constant attention and maintenance and are not easily adaptable to field operation. The chemical destruction of microforms is still another method. When utilized however, strict health, safety and environmental guidelines must be adhered to. Also, in the chemical stripping of films, the machines used to accomplish the stripping are large and cumbersome. Furthermore, not all chemical systems are useful for destroying the various types of film support and emulsions used in fabricating the microform.

The methods of destruction referred to above and presently in use have not provided a solution to the problem of rapidly destroying the classified microforms used by military planners, especially at the field operational level where time and space allocations are at a minimum. With the present invention, however, a composition has been found that provides for the destruction of the various types of microforms in a rapid and efficient manner. Destruction of the microforms is accomplished by using a chemical mixture comprised of 4-butyrolactone, methyl cellosolve acetate (ethylene gylcol monomethyl ether acetate) and aqueous sodium hypochlorite. The mixture is placed in a box, safe or any suitable container along with the microforms to be destroyed. Destruction of the various types of microform products is accomplished efficiently and economically in five minutes, or less.

SUMMARY OF THE INVENTION

In accordance with the present invention, it has been found that a chemical mixture composed of 4-butyrolactone, methyl Cellosolve acetate and aqueous sodium hypochlorite having an optimum formulation of about 25 volume percent 4-butyrolactone; about 25 volume percent methyl Cellosolve acetate; about 37 volume percent Am-chlor; and 13 volume percent water provides an optimum destruct solution. Am-chlor is a tradename for a 12.5% sodium hypochlorite solution distributed by Amchlor Corporation Pool Chemical Division of Amato Solvents, Inc. Silver Spring, Md. The chemical destruct mixture can be incorporated in any type of destruction box, safe or other container or system used to destroy classified or sensitive documents. The safe can be used for both storage and destruction of classified film.

The method of destruction is accomplished in the same manner regardless of the type of container. The chemical mixture is stored in two tanks of receptacles. One tank contains the mixture of 4-butyrolactone and methyl Cellosolve acetate as one component while the second tank contains the aqueous sodium hypochlorite as a second component. The film to be destroyed is then brought in contact with the chemical mixture. For example, the film can be positioned in a tray below the two storage tanks. The system is activated by allowing the chemical to mix and be distributed over the film. Once over the film the mix is suitably agitated to effect complete destruction. One suitable method of operation involves activating the system by flipping an external destruct switch which activates two initiators. The initiators then fire knife blades through Teflon discs to open the tanks. The chemicals are mixed and distributed over the stored microform products by a mixing/distribution tray. Once over the film, the chemicals can be agitated by either a 27 KHz or 40 KHz ultrasonic unit. The ultrasonic unit operates for about 5 minutes. It then shuts down as destruction is complete.

Accordingly, the primary object of this invention is to provide a chemical composition for the rapid and efficient destruction of classified microform products.

Another object of this invention is to provide a system for the rapid destruction of classified microforms under military tactical user situations.

Still another object of this invention is to provide a system for the 100 percent emergency destruction of a volume of microform of about 6.5 inches$\times$6.5 inches$\times$8.5 inches within 5 minutes or less.

A further object of this invention is to provide a system for destroying classified microform products that is capable of handling all types of microform including silver, diazo, dry diazo, vesicular and computer output microfiche in all common forms including fiche, rolls and aperature cards in one decomposition cycle.

The above and still further objects of this invention will become more readily apparent upon consideration of the following detailed disclosure thereof.

DESCRIPTION OF THE PREFERRED EMBODIMENT

The present invention encompasses a chemical composition or mixture for effecting the destruction of microform products, especially classified military documents being utilized during tactical operations. This facile system provides a rapid and efficient means for destroying all types of microfilm products including fiche, rolls, aperture cards, vesicular and computer output microfiches.

In order to destroy microform products in an effective manner, it is important that the composition of these products be known. Several types of microform products are commercially available. These products vary in their physical dimensions, the amount of image reduction, the material from which the base is made, and the composition of the emulsion. Generally, there are three basic physical shapes of microform products. These are roll and cartridge films, fiche and aperture cards.

The roll and cartridge microfilm is available in either a 16 or 35 mm format. Usually, a single row of images is printed on the film; but, side-by-side images are also possible. Fiche are the most commonly used microform products. These materials are 4×6 inch sheets on which images are arranged in rows and columns. Three image reduction ratios are currently in use for fiche. The 24× reduction ratio is the National Micrographics Association standard format. This format results in a 7 row, 14 column fiche containing a total of 98 images. The majority of the microfiche used today are in this format. Fiche made by a Computer Output Microfilm (COM) system generally are a 48× reduction. These fiche have 270 images arranged in 15 rows and 18 columns. The third microfiche format is the ultrafiche. This product contains 3200 images on a single fiche arranged in 40 rows and 80 columns. Aperture cards are computer cards containing a key-punched code and a film square. This film square is usually 35 mm although a 70 mm strip can also be used. Aperture cards are used mainly in the engineering fields to provide machine sorting of film images.

The microfilm product itself generally consists of a light sensitive emulsion layer which is coated on a transparent plastic support base. The type of emulsion and support material employed depends on the use of the product. Two types of support materials are, in general, used for microform products and comprise either a cellulose triacetate or cellulose diacetate support; or a polyethylene terelphthalate support. These particular materials are utilized as film bases because of their desirable physical properties of transparency, strength, ridigity and dimensional stability.

The cellulose triacetate support material is usually manufactured by esterification of cellulose. During this process, wood cellulose is treated with acetic anhydride, glacial acetic acid and a catalyst. If the reaction is carried to the theoretical limit, the resulting product would be 44.8% acetylated, however, the material used as a film based is only 43.5% acetylated. The slight reduction in acetyl groups results in a material with more desirable solubility characteristics. In some instances where solvent penetration of the film is desirable, the diacetate film support is used rather than the triacetate form.

In order to make the fiche or roll film base, the cellulose triacetate is cast into sheets of the desired physical dimensions. To accomplish this process, the cellulose triacetate or diacetate polymer is dissolved in solvents to form a dope. The dope solution is spread uniformly over a rotating heated chromium-faced drum. The solvent is allowed to evaporate and a plastic film results. The film sheet is cured and residual solvent removed. The sheet is then cut to the proper dimensions.

The polyethylene terephthalate support material is produced by ester interchange and polymerization of ethylene glycol and dimethyl terephthalate. Due to the limited solubility of polyethylene terephthalate in solvents, it is made into plastic sheets by melt casting instead of solvent casting. In the melt casting operation, the polymer is extruded through a long narrow slit onto a casting wheel. On the casting wheel, the material is cooled and coated with an adhesive copolymer. This copolymer is typically composed of vinylidene chloride, acrylonitrile and itaconic acid. The sheets are then stretched to orient the polymer and are heat set under tension.

The various properties of film base support materials for microform products are shown in Table I as follows.

TABLE I

| | Cellulose triacetate | | | Polyethylene terephthalate | |
|---|---|---|---|---|---|
| Property | | | | | |
| Specific gravity | 1.28 | | | 1.39 | |
| Refractive index, $N_d$ | 1.48 | | | 1.64 | |
| Water Absorption, % | 5.5 | | | 0.6 | |
| Folding endurance (MIT), No | 45 | | | 10,000 | |
| Tear resistance, g | 50 | | | 150 | |
| Heat distortion tem., °C. | 150 | | | 175 | |
| Nominal thickness, | | | | | |
| mils | 5.2 | 8 | 2.5 | 4 | 7 |
| μ | 130 | 200 | 64 | 100 | 180 |
| Solubility | | | | | |
| Methanol | W | | | N | |
| Acetone | W | | | N | |
| Methylene chloride | S | | | N | |
| Heptane | N | | | N | |
| Benzene | N | | | N | |

All physical tests conducted at 70° F., 50% relative humidity
Support thickness for tests: cellulose triacetate 5 mils polyethylene terephthalate 4 mils
S = soluble; W = swells; N = no effect The composition of the light sensitive layer affixed to the film support base depends on the type of image formed on the emulsion. Generally, three type of images are formed. These include the silver image, the diazo image and the vesicular image. Silver image microforms are produced for their high resolution and contrast. The majority of the silver image microforms in use are made from a conventional silver halide gelatin emulsion coated on a cellulose triacetate or diacetate base. The base is coated with an adhesive subcoating consisting of gelatin and cellulose nitrate in a mixture of organic solvents and water. When the subcoating is dry, the cellulose nitrate in the formulation provides good adhesion to the cellulose triacetate base. The gelatin in the subcoating insures good binding of the emulsion layer. The emulsion layer consists of a silver bromide light sensitive agent dispersed in a gelatin matrix. Additional layers of gelatin are coated over the emulsion to help protect it from scratches. An anti-halation layer is often coated on the back of the film. This layer normally contains dyes in a gelatin matrix. These dyes absorb light on film exposure but are decolorized on processing. This type of silver microform is exposed and developed in a manner similar to photographic film. However, due to the ease with which the image can be scratched, silver microforms on cellulose triacetate base are used almost exclusively as copy masters. Diazo and vesicular reproductions for everyday use are made from these masters.

Several types of diazo image products are commercially available. These products differ in the dye used to form the image, the base material and the method used to develop the image. The basic image formation process, however, is the same. This image formation process depends on the reaction of a diazonium salt with a coupler to form an azo dye. To form the image, a diazo film containing the image forming chemicals is placed in direct contact with the film to be copied. The diazo film is then exposed to ultraviolet light through the master film. In the areas where no printing is on the master film, the light reaches the diazo film and decomposes the diazonium salt. In the areas where no light strikes the diazo film, the diazonium salt remains undecomposed. The film is developed by altering its chemical composition to allow reaction of the diazonium salt and coupler to form the azo dyes.

Both cellulose diacetate and polyethylene terephthalate film bases are used for diazo products. With the cellulose triacetate base, the image forming chemicals become part of the film base. To make this type of film, the image forming chemicals are dissolved in solutions which penetrate the film and thus carry the chemicals into the film surface.

The vesicular microforms consist of a light sensitive diazonium salt which is evenly dispersed in a thermoplastic hydrophobic resin and coated on a polyethylene terephthalate base. Three processing stages are used to produce the vesicular film: exposure, developing and fixing. During the exposure process, the vesicular film is placed in contact with the original master. The vesicular film is then irradiated with ultraviolet light through the master. During exposure the diazonium salt is decomposed to form nitrogen gas. This gas is trapped within the resin. The film is developed by quickly heating for about $<0.5$ sec to a temperature that softens the resin. Tiny bubbles are formed by the pressure of the gas. Upon cooling these bubbles become the vesicular image. The fixing procedure involves exposure of the entire film to ultraviolet light to decompose any remaining diazonium salt. The gas formed is allowed to diffuse slowly out of the film leaving a clear area where no original exposure occured. Thus, the vesicular process is a reversal process with a negative image resulting from copying of a positive master.

In general, three techniques have been used for the routine destruction of classified film products. These techniques include incineration, mechanical destruction and chemical stripping. Incineration is generally regarded as the method of choice for destroying classified microform products. This method should theoretically result in complete destruction of the film. However, unless conditions are carefully controlled, sizable pieces of film can be obtained from the ash or in the gaseous emissions. In addition, gaseous emissions often do not meet pollution control standards.

Although these incinerators have been shown to provide an acceptable method for routine destruction of film products if careful controls are maintained, they are not useful for field commands. The usefulness of these incinerators for routine and/or emergency destruction of film products at field commands is limited by their bulkiness; the careful monitoring required to destroy the film; the need to meet acceptable environmental standards; the length of time required to destroy the film; and the long recycle time (~about 24 hours).

Mechanical destruction techniques require the use of shredders and pulverizers. As was found for the incinerators that are available for routine destruction of classified film, the mechanical shredders and pulverizers are large pieces of equipment that require constant attention during operation. Thus, these commercially available types of equipment do not provide a satisfactory solution to routine and emergency microform destruction at tactical command levels.

Several sources have developed and built devices for routine chemical stripping of classified film. In general these devices are designed for stripping of silver film. The stripping processes generally use sodium hypochlorite (laundary bleach) or hot sodium hydroxide to remove the silver emulsion from the film, although some proprietary formulations are known. The resultant of these processes is a clear film base which can be made into a marketable product. The sludge contains the silver that was stripped from the film. This silver can be recovered and sold. In general, however, chemical strippers built for routine destruction of classified film products are large machines which require continuous monitoring. Thus, this commercially available equipment would not be useful in tactical commands.

In attempting to overcome the problems previously encountered in destroying classified microforms during tactical operations, it was found in accordance with this invention that a three component chemical mixture provided a rapid and efficient system for destroying the various types of microform products. The chemical mixture comprises a formulation of 4-butyrolactone, methyl Cellosolve acetate and aqueous sodium hypochlorite. This mixture forms a miscible solution upon combination of the components but slowly separates into two layers. Thus, stirring must be provided in order to insure that the solution remains homogenous throughout the desired five minute destruct period. The mixture also decomposes rapidly. Tests show that the time required to strip the silver image from cellulose triacetate film increases from 23 seconds (for times up to 10 minutes after combination) to 65 seconds after the mixed solution has aged for 15 minutes. Consequently, the sodium hypochlorite solution must be stored separately from the organic solvents. Despite this slight difficulty, the solution provides an efficient and workable system which overcomes the problems encountered heretofore in attempting to destroy classified microforms at the tactical level.

Table II, as follows, discloses the optimization of the three component system of this invention and it was found that a mixture comprising about 25 volume percent methyl Cellosolve acetate; about 25 volume percent 4-butyrolactone; about 37 volume percent Am-Chlor and about 13 volume percent water proved to be most efficient in destroying a volume of microform of about 6.5 inches by 6.5 inches by 8.5 inches within 5 minutes.

In addition to the composition of the chemical mixture of this invention another factor which contributes to the effectiveness of the system of the invention is the stirring methodology. Two methods for stirring the 4-butyrolactone, methyl Cellosolve acetate, sodium hypochlorite mixture (hereafter referred to as the destruct chemical) were studied. Tests were performed in the laboratory to evaluate the image removal rate with a pumped solution (simulated with a magnetic stirrer)

and with ultrasonic agitation. For these tests 50 ml of the destruct chemical and a 1" by 1.5" film strip were placed in a beaker. Stirring was achieved with a magnetic stirrer or by dipping the beaker into a small ultrasonic cleaner fluid filled with water. The results of these tests are compared with tests in which no agitation was used in Table III.

TABLE II

| % 4-butyrolactone by volume | % Methyl Cellosolve Acetate by volume | % Am-Chlor by volume | % Water by volume | Time for Image Removal: Polyester Base Film: Silver | Dry Diazo | Diazo | Vesicular | Cellulose Triacetate Base Film: Silver | Diazo |
|---|---|---|---|---|---|---|---|---|---|
| 10 | 40 | 37 | 13 | 10 sec | 45 sec | 25 sec | 1 min | 22 sec | 2.5 min |
| 20 | 30 | 37 | 13 | 10 sec | 45 sec | 20 sec | 40 sec | 22 sec | 3.0 min |
| 30 | 20 | 37 | 13 | 10 sec | 55 sec | 15 sec | 40 sec | 22 sec | 3.0 min |
| 40 | 10 | 37 | 13 | 10 sec | 55 sec | 15 sec | 45 sec | 20 sec | 3.25 min |

TABLE III

| | Polyester Base Film | | Triacetate Base Film | |
|---|---|---|---|---|
| | Diazo | Vesicular | Silver | Diazo |
| No agitation | 15 sec | 95 sec | 50 sec | 180 sec |
| Magnetic Stirrer | 10 sec | 70 sec | 35 sec | 120 sec |
| Ultrasonics | 5 sec | 20 sec | 10 sec | 60 sec |

As can be seen from Table III, stirring with ultrasonic yielded significantly faster image removal than a magnetic stirrer. In addition, the ease with which ultrasonic stirring could be coupled with batch chemical film destruction makes it the system of choice.

Another factor of importance is the volume of destruct chemical necessary to destroy a specific volume of film. The volume of film chosen as a base condition was one 4"×6" piece of microfiche having images covering the entire fiche. For this experiment, a total of 30 ml of the destruct chemical was placed in a beaker. The fiche were cut into 4 pieces each, a nylon mesh placed between each piece and the unclamped bundle placed in the liquid. The beaker was then lowered into the sonifier until destruction occured. Examination of the results showed that the destruction of the cellulose triacetate silver film is the limiting case. At least 3 sheets of the fiche can be destroyed by 30 ml of the destruct solution in a reasonable time period. Thus, the desired volume of destruct solution is about 10 ml per fiche.

Various materials of construction were tested for their compatability with the sodium hypochlorite solution, the butyrolactone-methyl Cellosolve acetate mixed solution and the destruct solution mixture as a complete composition. The materials tested for compatibility are listed in Table IV. After weighing, coupons of these materials were immersed in 50 ml of the individual chemicals. These materials were allowed to sit for one month at ambient temperatures. Observations were made on a weekly basis. Materials which appeared undisturbed were dried and reweighed to determine if any weight loss occurred.

No reasonably priced metals were found to be compatible with the sodium hypochlorite solution. Teflon coating of the metal significantly reduced the degradation reaction. Teflon and polyesters were found to be very compatible with the hypochlorite solution. Thus, molded fiber glass reinforced polyester was determined to be the best material for storage of the sodium hypochlorite solution. All major parts in contact with this solution should be preferably coated with Teflon. The butyrolactone—methyl Cellosolve acetate solution was found to be compatible with all metals tested as well as Teflon and the polyester. Stainless steel 316 was found to be preferable for constructing the storage container for this solvent mixture.

TABLE IV

| Material | Sodium Hypochlorite | Butyrolactone-Methyl Cellosolve Acetate | Destruct Solution Mixture |
|---|---|---|---|
| Stainless Steel 304 | pitting within 1 day | compatible | pitting within 1 day |
| Stainless Steel 316 | pitting within 2 days | compatible | pitting within 3 days |
| Hasteloy 276 | pitting within 2 days | compatible | pitting within 3 days |
| Polyester | compatible | compatible | compatible |
| Fiberglass Reinforced Polyester | compatible | compatible | compatible |
| Teflon Coated Stainless Steel 316 | compatible if no scratches in the Teflon | compatible | compatible if no scratches in the Teflon |
| Teflon | compatible | compatible | compatible |

In effecting the destruction of microfilm products, the chemical destruct solution of the invention is stored in two separate tanks or suitable containers preferably fabricated from the construction materials referred to above. If desired, the containers can be positioned within a destruct box or a safe such as a modified Class 6 field safe. The method of destruction is the same whether a safe is utilized for storing and destroying the microfilms or merely a destruct box type of container for effecting destruction alone. One of the storage tanks contains the 4-butyrolactone—methyl Cellosolve acetate component of the destruct solution while the second tank contains the aqueous sodium hypochlorite component of the destruct solution. The film to be destroyed is positioned below the two storage tanks in a suitable tray. Suitable means are provided for mixing the two components of the destruct solution and allowing the mixture to come in contact with the microfilm in the tray. For example, the system can be activated by an external destruct switch which activates two initiators. The initiators fire knife blades through Teflon discs opening the tanks and allowing the destruct solution to flow into the tray for distribution over the microfilm. Once over the film the destruct solution is agitated by a 27 KHz or 40 KHz ultrasonic unit. The ultrasonic unit operates for about 5 minutes. It then shuts down and destruction is complete. Refurbishment of the system can be accomplished in about 15 minutes by draining the used destruct solution and replacing the tanks and initiators. Although the use of an ultrasonic agitator is preferable, it is not essential since chemical destruction of the stored microform product will still take place. Consequently, the chemical mixture of this invention can be extended and adapted for use with other destruct system devices.

In view of the foregoing, it can be seen that the present invention provides a rapid method for destroying all types of microform products using a mixture of chemicals. This chemical mixture is an unexpected improvement over state-of-the-art methods in that all types of films can be destroyed at one time. No separation of silver, diazo or vesicular film is necessary.

While the invention has been described with particularity in reference to a specific embodiment thereof, it should be understood that the disclosure of the invention is presented for the purpose of illustration only. It is not intended to limit the scope of the invention in any way except as defined by the appended claims.

What is claimed is:

1. A chemical destruct solution especially adapted for destroying microform products which comprises a mixture of about 10 to 40 volume percent 4-butyrolactone, about 10 to 40 volume percent ethylene glycol monomethyl ether acetate, about 37 volume percent of a 12.5 percent sodium hypochlorite solution, and about 13 volume percent water.

2. A chemical destruction solution in accordance with claim 1 wherein said mixture comprises about 25 volume percent 4-butyrolactone, about 25 volume percent ethylene glycol monomethyl ether acetate, about 37 volume percent of a 12.5 percent sodium hypochlorite solution and about 13 volume percent water.

* * * * *